United States Patent

Mason et al.

[15] 3,689,487

[45] Sept. 5, 1972

[54] TRIAZINYLAMINO SUBSTITUTED DIMETHYL ETHERS

[72] Inventors: Paul J. Mason, Rte. 2, Box 973; William R. Moore, 12565 Brook Lane, both of Chester, Va. 23831; Harry E. Ulmer, 2503 W. Broadway, Hopewell, Va. 23860

[22] Filed: Jan. 27, 1971

[21] Appl. No.: 110,335

Related U.S. Application Data

[62] Division of Ser. No. 757,456, Sept. 4, 1968, Pat. No. 3,595,639.

[52] U.S. Cl..................................260/249.8, 71/93
[51] Int. Cl. ...........................................C07d 55/20

[58] Field of Search...................................260/249.8

[56] References Cited

UNITED STATES PATENTS 3,309,345  3/1967  Lutwack.............260/249.8 X
3,317,529  5/1967  Beachem et al. ...260/249.8 X Primary Examiner—John M. Ford

[57] ABSTRACT

N,N'-bis[(2-chloro-4-alkylamino-6-s-triazinyl)amino]-dimethyl ethers are prepared by reacting a 2-alkylamino-4-amino-6-chloro-s-triazine with formaldehyde in alkaline solution. The products are highly selective herbicides.

3 Claims, No Drawings

TRIAZINYLAMINO SUBSTITUTED DIMETHYL ETHERS

CROSS REFERENCE TO RELATED APPLICATIONS

This application is a division of Application Ser. No. 757,456, filed Sept. 4, 1968, now U.S. Pat. No. 3,595,639.

BACKGROUND OF THE INVENTION

This invention relates to novel triazinylamino substituted dimethyl ethers; in particular it relates to N,N'-bis[(2-chloro-4-alkylamino-6-s-triazinyl)amino]dimethyl ethers which are useful as herbicides.

Over the past few years a large number of chemical herbicides have been placed on the market, but despite the increasing number of herbicides there remain problems for which none or few herbicides are appropriate. For example, nonselective herbicides are available which when used for postemergence will produce high kills of all vegetation; selective herbicides are available which will attack dicotyledonous or monocotyledonous plants but which also cause a high percent of crop injury. There are very few compounds available which are so selective that they will attack all forms of vegetation with the exception of one crop and accordingly there is a great need in the art for such a herbicide. This need may be shown by the fact that previously, in order to destroy all vegetation except one crop, it was necessary to employ at least two separate herbicides, a method which would make such a procedure economically and commercially impractical.

SUMMARY OF THE INVENTION

The novel triazinylamino substituted dimethyl ethers of the instant invention are those of the formula

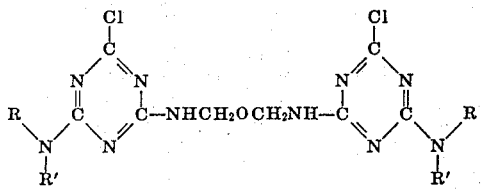

wherein R is alkyl containing up to five carbon atoms and R' is hydrogen or alkyl containing up to five carbon atoms. These products are highly selective herbicides.

DESCRIPTION OF THE INVENTION

The triazinylamino substituted dimethyl ethers of the instant invention are prepared by reacting a 2-alkylamino-4-amino-6-chloro-s-triazine with formaldehyde in alkaline solution. Approximately equimolar amounts of the two reactants are used. Reaction-inert solvents which might be used include benzene, toluene, chloroform, and carbon tetrachloride. Alkaline catalysts which may be used include sodium hydroxide, potassium hydroxide, tertiary amines such as triethylamine, and the like. Paraformaldehyde is the usual source of formaldehyde and results in the initial reaction mixture being a slurry.

Normally the reaction mixture will be agitated at ambient temperatures of about 15°–35° C. and atmospheric pressure, although higher temperatures and pressures may be employed if desired. Reaction time of 8 to 24 hours is normally sufficient. After completion of the reaction, the mixture is filtered and the solvent removed under reduced pressure to afford the product as a solid residue. The product can be purified by recrystallization from methanol and the like.

The 2-alkylamino-4-amino-6-chloro-s-triazines of use in the preparation of the instant products may be synthesized by means taught in the art, for example, Pearlman and Banks, J. Am. Chem. Soc., 70 3726–3728 (1948).

The instant compounds have been found to be unexpectedly effective herbicides in that they are very harmful to all forms of grass and broadleafed weeds, while being harmless toward such plants as corn and wheat. N,N'-bis[(2-chloro-4-isopropylamino-6-s-triazinyl)amino]dimethyl ether is the preferred compound for this purpose.

Normally, the instant compounds will be used as the active ingredient in an herbicidal composition, although they might also be used without a carrier. Various diluents and carriers may be employed and the percent of active ingredient may be varied. Although compositions with less than about .25 percent by weight of active ingredient may be used, it is preferable to use compositions containing at least about .50 percent of active ingredient because otherwise the amount of carrier becomes excessively large. Activity increases with the concentration of active ingredient, which may be 10, 50, 95 percent or even higher.

The amount of composition which is applied for effective herbicidal action is dependent upon considerations such as the type of undesirable plant to be killed, the density of undesirable plants, and soil and climatic conditions. Usually, sufficient composition will be applied to provide about 1 to 10 pounds of active ingredient per acre.

The instant herbicidal compositions may be in the form of a solution, with the solvent being selected from acetone, methanol and the like. These solutions can be applied to the plants in a direct manner such as by spraying, sprinkling, drenching, etc. Liquid suspensions can also be applied in this manner, with the dispersant selected from liquids such as water and the like.

Application can also be achieved by dusting a powder in which the active ingredient is dispersed. Suitable carriers include finely powdered material such as clay, fuller's earth and talc.

The instant compounds may constitute the sole active ingredient in the herbicidal compositions, but they might be effectively used in combination with other active ingredients, such as other herbicides, insecticides and other plant treating agents.

Inasmuch as the instant compounds are only sparingly soluble in water, it is often convenient to utilize them in the form of their water-soluble salts, for example as the hydrochloride salt.

The following examples are provided to more fully illustrate the instant invention. They are provided for illustrative purposes only and are not to be construed as limiting the scope of the instant invention, which is defined by the appended claims.

EXAMPLE I

N,N'-bis[(2-chloro-4-isopropylamino-6-s-triazinyl)amino]dimethyl ether

2-Amino-4-chloro-6-isopropylamino-s-triazine (37.6 grams) was mixed in a flask with 200 ml. benzene and 2 drops of 50 percent aqueous sodium hydroxide. Paraformaldehyde (6grams) was added to the mixture and the resulting slurry was stirred at about 25° C. for 24 hours. The reaction mixture was then filtered and the solvent was removed from the filtrate by evaporation at 60° C. under reduced pressure to afford the desired product as a solid residue, 42 grams (55 percent), m. p. 116°–125° C.

Anal. Calc'd for $C_{14}H_{22}Cl_2N_{10}O$: C, 40.3; H, 5.3; N, 33.6; Cl, 17.0. Found: C, 41.7; H, 5.6; N, 32.3; Cl, 17.6.

EXAMPLE II

The procedure of Example I is repeated using an equivalent amount of appropriate triazine in place of said 2-amino-4-chloro-6-isopropylamino-s-triazine to afford the following products:

N,N'-bis[(2-chloro-4-methylamino-6-s-triazinyl)amino]-dimethyl ether
N,N'-bis[(2-chloro-4-n-butylamino-6-s-triazinyl)amino]-dimethyl ether
N,N'-bis[(2-chloro-4-isoamylamino-6-s-triazinyl)amino]-dimethyl ether
N,N'-bis[(2-chloro-4-dimethylamino-6-s-triazinyl)amino]-dimethyl ether
N,N'-bis[(2-chloro-4-diethylamino-6-s-triazinyl)amino]-dimethyl ether
N,N'-bis[(2-chloro-4-methylisopropylamino-6-s-triazinyl-amino]dimethyl ether
N,N'-bis[(2-chloro-4-methylethylamino-6-s-triazinyl)amino]-dimethyl ether
N,N'-bis[(2-chloro-4-ethyl-n-butylamino-6-s-triazinyl)-amino]dimethyl ether
N,N'-bis[(2-chloro-4-ethylisoamylamino-6-s-triazinyl)amino]-dimethyl ether

EXAMPLE III

Herbicidal Activity

The following crop species and weed species were planted in metal flats (12 × 8.5 × 4 inches) in greenhouse potting soil containing one-third mixed clay and sand, one-third mushroom soil, and one-third peat moss. The pH of the soil was 6.8–7.2.

Crop species
Corn, Zea mays, Hybrid U.S. 13
Wheat, Triticum vulgare, variety Thorne
Cotton, Gossypium hirsutum, variety Delta Pine Lane Fox No. 20
Weed Species
Mustard
Yellow Foxtail
Crabgrass
Buckwheat
Morning Glory Each flat received a volume of spray equal to 50 gallons per acre of an acetone solution of N,N'-bis[(2-chloro-4-isopropylamino-6-s-triazinyl)amino]dimethyl ether. The concentration of the solution was adjusted to provide application of one, two, and four pounds of active ingredient per acre. Immediately after spraying, the test flats were placed in aluminum trays and were irrigated until the surface of the soil in the flat was uniformly moist (at field capacity). Additional subirrigation was provided as needed to maintain moisture. No surface irrigation was applied.

The flats were sprayed within one day after seeding in preemergence tests, and 8–10 days after seeding in the post-emergence tests. Results were observed 14 days after spraying.

The effect of the herbicide was evaluated in terms of the injury rating index scale, ranging from zero to 10 as follows:
0 - No apparent injury
1,2,3 - Slight injury
4,5,6 - Moderate injury
7,8,9 - Severe injury (plants will die)
10 - Plants were dead An injury rating of 3 is the maximum tolerated for crops and a rating of 7 is the minimum acceptable on weed plants.

| Plant | Preemergence * |  | * | Postemergence * |  | * |
|---|---|---|---|---|---|---|
| Corn | 0 | 0 | 0 | 0 | 0 | 0 |
| Wheat | 0 | 0 | 0 | 0 | 0 | 0 |
| Cotton | 1 | 0 | 0 | 10 | 10 | 5 |
| Mustard | 10 | 10 | 7 | 10 | 10 | 10 |
| Yellow Foxtail | 5 | 5 | 4 | 9 | 8 | 6 |
| Crabgrass | 9 | 9 | 9 | 6 | 3 | 0 |
| Buckwheat | 10 | 10 | 9 | 10 | 10 | 10 |
| Morning Glory | 10 | 10 | 9 | 10 | 9 | 8 |

* 4 pounds of active ingredient per acre
** 2 pounds of active ingredient per acre
*** 1 pound of active ingredient per acre

What is Claimed is:
1. A compound of the formula

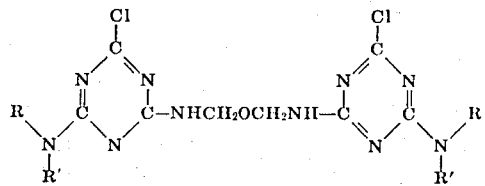

wherein R is alkyl containing up to five carbon atoms and R' is hydrogen or alkyl containing up to five carbon atoms.

2. A compound of claim 1 wherein R' is hydrogen.
3. The compound of claim 1 wherein R is isopropyl and R' is hydrogen.

* * * * *

PO-1050
(5/69)

UNITED STATES PATENT OFFICE
CERTIFICATE OF CORRECTION

Patent No. 3,689,487                    Dated September 5, 1972

Inventor(s) Paul J. Mason, William P. Moore and Harry E. Ulmer

It is certified that error appears in the above-identified patent and that said Letters Patent are hereby corrected as shown below:

Cover page, Item [72] Inventors: "William R. Moore" should be --William P. Moore--.

Column 4, claim 1, formula:

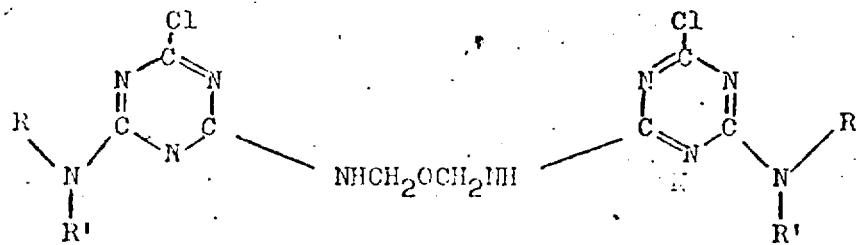

should be:

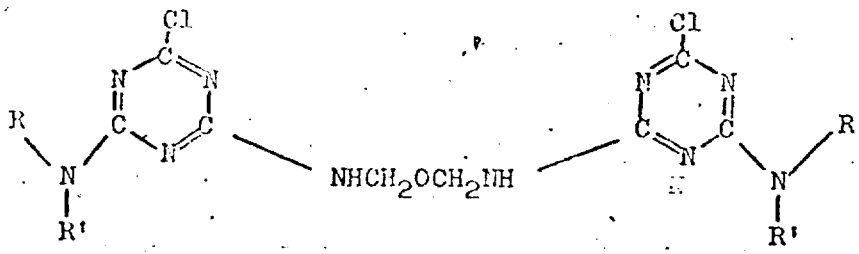

Signed and sealed this 6th day of February 1973.

(SEAL)
Attest:

EDWARD M. FLETCHER, JR.
Attesting Officer

ROBERT GOTTSCHALK
Commissioner of Patents